United States Patent
Nakagawa (10) Patent No.: US 11,489,880 B2
(45) Date of Patent: Nov. 1, 2022

(54) CONTROLLER TO DETERMINE A TRANSMISSION RIGHT AND CONTROL A TIMING OF COMMUNICATION BETWEEN NODES

(71) Applicants: KABUSHIKI KAISHA TOSHIBA, Minato-ku (JP); TOSHIBA INFRASTRUCTURE SYSTEMS & SOLUTIONS CORPORATION, Kawasaki (JP)

(72) Inventor: Katsutoshi Nakagawa, Fuchu (JP)

(73) Assignees: KABUSHIKI KAISHA TOSHIBA, Tokyo (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 17/604,798

(22) PCT Filed: Mar. 16, 2020

(86) PCT No.: PCT/JP2020/011485
§ 371 (c)(1),
(2) Date: Oct. 19, 2021

(87) PCT Pub. No.: WO2020/225980
PCT Pub. Date: Nov. 12, 2020

(65) Prior Publication Data
US 2022/0182422 A1 Jun. 9, 2022

(30) Foreign Application Priority Data
May 7, 2019 (JP) .............................. JP2019-087590

(51) Int. Cl.
*G06F 15/173* (2006.01)
*H04L 65/10* (2022.01)

(52) U.S. Cl.
CPC .............................. *H04L 65/1013* (2013.01)

(58) Field of Classification Search
CPC ........................ H04L 65/1013; H04L 65/1043
(Continued)

(56) References Cited

U.S. PATENT DOCUMENTS 7,765,294 B2 * 7/2010 Edwards ............. H04L 65/1101
709/224
10,678,592 B2 * 6/2020 Enomoto ............ H04L 65/4007
(Continued)

FOREIGN PATENT DOCUMENTS

JP 2003-263402 A 9/2003
JP 2016-225929 A 12/2016

OTHER PUBLICATIONS

International Search Report dated Jun. 9, 2020 in PCT/JP2020/011485 filed on Mar. 16, 2020, 6 pages (with English translation).
(Continued)

*Primary Examiner* — Bharat Barot
(74) *Attorney, Agent, or Firm* — Maier & Maier, PLLC (57) ABSTRACT

A controller includes a real-time communication unit, an application communication unit, and a socket management unit. The real-time communication unit communicates with an external node by using a first socket on a basis of a transmission right map indicating a node possessing a transmission right out of multiple nodes. The application communication unit communicates, not on a basis of the transmission right map, with the external node by using a second socket differing from the first socket. The socket management unit restricts at least one of transmission of information by the application communication unit to the external node and reception of information by the application communication unit from the external node.

4 Claims, 8 Drawing Sheets

(58) Field of Classification Search
USPC .................................................. 709/223–226
See application file for complete search history.

(56) References Cited

U.S. PATENT DOCUMENTS

| | | | | |
|---|---|---|---|---|
| 2002/0045956 | A1* | 4/2002 | Kapitan ............... | G05B 19/414 |
| | | | | 709/208 |
| 2002/0064163 | A1* | 5/2002 | Fujiyama .......... | H04L 12/40182 |
| | | | | 370/428 |
| 2006/0206894 | A1* | 9/2006 | Jung ..................... | G06F 9/4887 |
| | | | | 718/100 |
| 2007/0160192 | A1* | 7/2007 | Horio ..................... | H04M 3/56 |
| | | | | 379/338 |
| 2009/0076745 | A1* | 3/2009 | Sakashita ............... | H02H 7/261 |
| | | | | 702/57 |
| 2016/0360497 | A1 | 12/2016 | Maruyama et al. | |
| 2019/0121666 | A1* | 4/2019 | Tsuchiya ............... | G06F 9/5027 |

OTHER PUBLICATIONS

Nomura et al., "Communication Control of Real-time Packets", IPSJ SIG Technical reports, vol. 2005, No. 79, Aug. 3, 2005, fig. 4, "1. Introduction", "3. Implementations", pp. 79-85, 17 total pages (with unedited computer-generated English translation).

* cited by examiner

| 5 | 4 | 3 | 2 | 1 | 0 |
|---|---|---|---|---|---|
| - | NODE NUMBER: 28 | NODE NUMBER: 27 | NODE NUMBER: 26 | NODE NUMBER: 25 | NODE NUMBER: 24 |
| NODE NUMBER: 23 | NODE NUMBER: 22 | NODE NUMBER: 21 | NODE NUMBER: 20 | NODE NUMBER: 19 | NODE NUMBER: 18 |
| NODE NUMBER: 17 | NODE NUMBER: 16 | NODE NUMBER: 15 | NODE NUMBER: 14 | NODE NUMBER: 13 | NODE NUMBER: 12 |
| NODE NUMBER: 11 | NODE NUMBER: 10 | NODE NUMBER: 9 | NODE NUMBER: 8 | NODE NUMBER: 7 | NODE NUMBER: 6 |
| NODE NUMBER: 5 | NODE NUMBER: 4 | NODE NUMBER: 3 | NODE NUMBER: 2 | NODE NUMBER: 1 | - |

FIG.4

| TRANSMISSION CYCLE NUMBER | TRANSMISSION CYCLE |
|---|---|
| 1 | CYCLE(ms) |
| 2 | CYCLE(ms) |
| Y | CYCLE(ms) |

CONTROLLER TO DETERMINE A TRANSMISSION RIGHT AND CONTROL A TIMING OF COMMUNICATION BETWEEN NODES

CROSS-REFERENCE TO RELATED APPLICATIONS

This application is a national stage application of International Application No. PCT/JP2020/011485, filed Mar. 16, 2020, which designates the United States, incorporated herein by reference, and which claims the benefit of priority from Japanese Patent Application No. 2019-087590, filed May 7, 2019, the entire contents of which are incorporated herein by reference.

FIELD

Embodiments described herein relate to a controller.

BACKGROUND

For implementing real-time communication with the external node over a local area network (LAN), an industrial controller causes a transmission control unit provided in the controller to determine which node has obtained a transmission right and control a timing of communication between nodes on the basis of a result of the determination.

With the spread of IoT, the number of devices connected to a LAN increases, and there is an increasing demand for a LAN to which nodes performing communication in different communication procedures can be connected, instead of a dedicated LAN to which only nodes performing communication in the same communication procedure are connected. This is because in a case where the nodes that perform communication in different communication procedures share the LAN, cost required for laying the network and the number of devices for connection can be reduced.

DETAILED DESCRIPTION

A controller according to an embodiment includes a real-time communication unit, an application communication unit, and a socket management unit. The real-time communication unit communicates with an external node by using a first socket on a basis of a transmission right map indicating a node possessing a transmission right out of multiple nodes. The application communication unit communicates, not on a basis of the transmission right map, with the external node by using a second socket differing from the first socket, The socket management unit restricts at least one of transmission of information by the application communication unit to the external node and reception of information by the application communication unit from the external node.

Hereinafter, an example of a controller according to the present embodiment will be described with reference to the accompanying drawings.

First Embodiment

Figure 1:
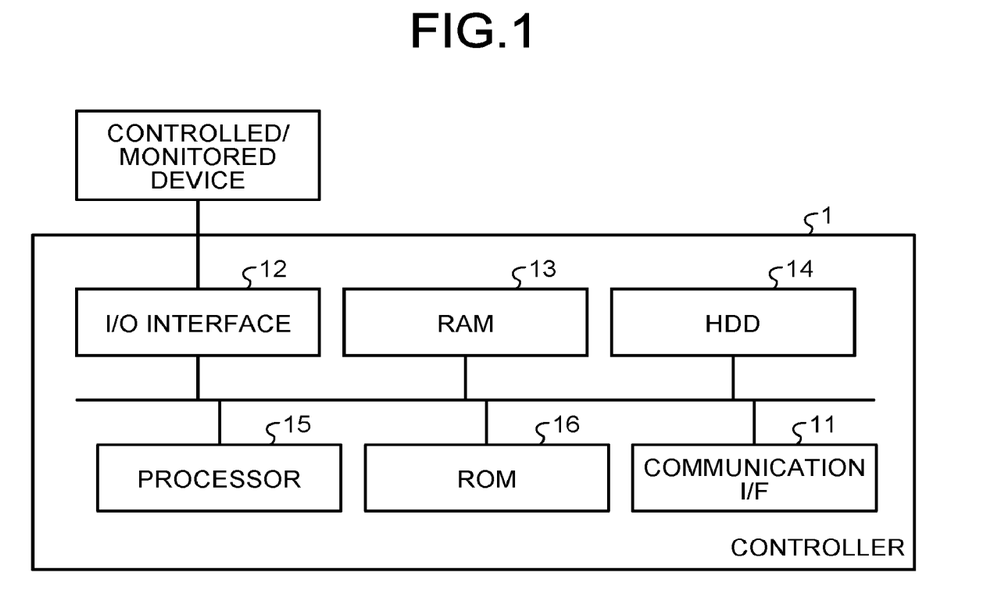
FIG. 1 is a block diagram illustrating an example of a hardware configuration of a controller according to a first embodiment.

FIG. 1 is a block diagram illustrating an example of a hardware configuration of a controller according to a first embodiment. First, the example of a hardware configuration of a controller 1 according to the present embodiment will be described with reference to FIG. 1.

As illustrated in FIG. 1, the controller 1 according to the present embodiment includes a communication I/F 11, an I/O interface 12, a random access memory (RAM) 13, a hard disk drive (HDD) 14, a processor 15, and a read only memory (ROM) 16.

The communication I/F 11 is an interface for connecting to a communication network such as a local area network (LAN).

The I/O interface 12 is an interface for the controller 1 to connect to a controlled/monitored device to be controlled/monitored. The controlled/monitored device is, for example, a device installed in an industrial plant. The controller 1 according to the present embodiment transmits and receives signals to and from the controlled/monitored device.

The RAM 13 is a volatile memory from and into which information can be read and written by the HDD 14 at a high speed, and is used not only as a work area but also as a part of a virtual shared memory by the controller 1.

The HDD 14 is a nonvolatile storage unit from and into which information can be read and written, and is used not only for storage of applications and the like, but also as a part of a virtual shared memory.

The processor 15 functions as a control unit that controls the entire controller 1. The processor 15 reads out a program from the ROM 16, executes the program, and expands a result of the execution on the RAM 13, and thus each element is implemented.

Figure 2:
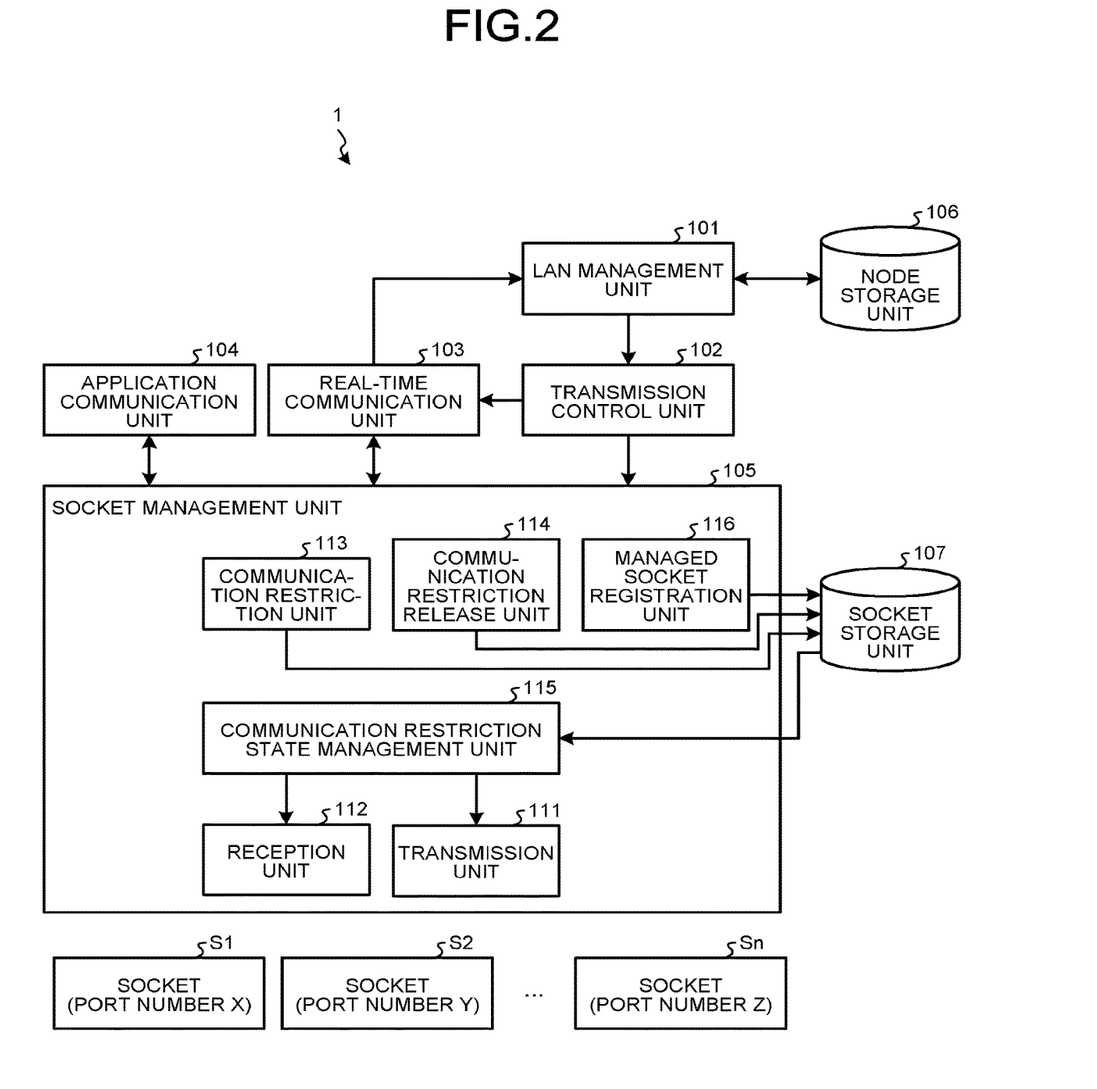
FIG. 2 is a block diagram illustrating an example of a functional configuration of the controller according to the first embodiment.

FIG. 2 is a block diagram illustrating an example of a functional configuration of the controller according to the first embodiment. First, an example of a functional configuration of the controller 1 according to the present embodiment will be described with reference to FIG. 2.

The controller 1 according to the present embodiment is an industrial controller, and is an example of a node (transmission device) connected to a LAN. The controller 1 is required to have real-time performance such that communication with a node connected to the LAN is completed within a given period of time. Therefore, the controller 1 performs, on the basis of a transmission right map, real-time communication for communicating with the external node by using a preset socket. The transmission right map is a map indicating one or more nodes each possessing a transmission right out of multiple nodes (which are connected to the LAN and perform real-time communication in the present embodiment). The transmission right goes around (circulates) through the multiple nodes in a preset order. In the present embodiment, in a case where the controller 1 receives information from the external node by using a preset socket and the controller 1 itself obtains a transmission right, the controller 1 executes real-time communication for transmitting information to the external node within a preset transmission period by using the preset socket.

There are two types of methods for implementing real-time communication: isochronous real time (IRT), and soft real time (SRT). The IRT is a method of implementing communication between nodes by dedicated hardware. The SRT is a method of implementing communication between nodes by software without using dedicated hardware. In the present embodiment, it is assumed that the controller 1 implements real-time communication by the SRT.

Specifically, in the controller 1 according to the present embodiment, the processor 15 (an example of the hardware processor) reads out a program from the ROM 16 and loads the program onto the RAM 13, and thereby a LAN management unit 10L a transmission control unit 102, a real-time communication unit 103, an application communication unit 104, and a socket management unit 105 are implemented, as illustrated in FIG. 2. A node storage unit 106 and a socket storage unit 107 are each implemented by a memory medium such as the RAM 13.

The node storage unit 106 stores an Inring map and a transmission right map. The Inring map is a map indicating one or more nodes each performing real-time communication out of nodes connected to the LAN. The transmission right map is a map indicating one or more nodes each possessing a transmission right out of the nodes (which are indicated by the Inring map in the present embodiment) that perform real-time communication, as described above.

The socket storage unit 107 stores a managed socket table and communication restriction states. The managed socket table is a table indicating a number (hereinafter referred to as a socket number) of sockets used for real-time communication out of sockets S1 to Sn of the controller 1 (n is an integer of 1 or more; hereinafter referred to as a socket S in a case where it is not necessary to distinguish the sockets S1 to Sn). The socket S is a socket (port) used for communication between nodes over the LAN and to which a unique port number or IP address is allocated.

The communication restriction states include a transmission restriction state and a reception restriction state. The transmission restriction state is information indicating whether or not to restrict transmission of information by the application communication unit 104 to the external node. The reception restriction state is information indicating whether or not to restrict reception of information by the application communication unit 104 from the external node. In the present embodiment, the transmission restriction state and the reception restriction state are each 1-bit information, and "0" is set as an initial value thereof.

The LAN management unit 101 determines nodes that perform real-time communication out of the nodes connected to the LAN on the basis of a result of communication with the external node by the real-time communication unit 103 described later. The LAN management unit 101 then generates the Inring map on the basis of a determination result of the nodes that perform the real-time communication, and writes the generated Inring map onto the node storage unit 106.

Moreover, on the basis of a result of communication with the external node by the real-time communication unit 103 described later and a preset transmission period, the LAN management unit 101 determines a node possessing a transmission right out of the nodes that perform real-time communication. The LAN management unit 101 then updates the transmission right map stored in the node storage unit 106 on the basis of a determination result of the node possessing the transmission right. The LAN management unit 101 reads out the transmission right map from the node storage unit 106 at a preset cycle, and gives the readout transmission right map to the transmission control unit 102.

The transmission control unit 102 determines which of the nodes possess the transmission right. In the present embodiment, the transmission control unit 102 determines which node has obtained the transmission right, on the basis of the transmission right map given by the LAN management unit 101. In a case where the transmission control unit 102 determines that the controller 1 itself has obtained the transmission right, the transmission control unit 102 informs the real-time communication unit 103 that the controller 1 itself has obtained the transmission right.

Furthermore, on the basis of the determination result indicating which node possesses the transmission right, the transmission control unit 102 informs the socket management unit 105 that the communication with the external node by the application communication unit 104 is restricted, and that restriction of the communication with the external node by the application communication unit 104 is released.

The real-time communication unit 103 performs, on the basis of the transmission right map, real-time communication for communicating with the external node by using a preset socket (in the present embodiment, the socket S2) out of the sockets S1 to Sn of the controller 1. Specifically, in a case where the transmission control unit 102 determines that the controller 1 itself possesses the transmission right, the real-time communication unit 103 receives information from the external node by using the socket S2 and performs real-time communication for transmitting information to the external node by using the socket S2.

The application communication unit 104 communicates, not on the basis of the transmission right map, with the external node by using a socket S (in the present embodiment, the socket S1) which differs from the socket S2 used for real-time communication, out of the sockets S1 to Sn. Specifically, the application communication unit 104 performs, not on the basis of the transmission right map, non-real-time communication for transmitting and receiving information to and from the external node by using the socket S1.

The socket management unit 105 is a socket application programming interface (API) or the like, and controls communication using a socket S with the external node by the real-time communication unit 103, the application communication unit 104. Specifically, the socket management unit 105 restricts transmission of information to the external node and reception of information from the external node by the application communication unit 104.

This makes it possible to prevent communication (real-time communication) with the external node by the real-time communication unit 103 from failing when an application performing non-real-time communication between nodes in accordance with a communication procedure differing from the real-time communication is included. As a result, a delay of real-time communication by the real-time communication unit 103 can be suppressed.

The restriction of non-real-time communication with the external node by the application communication unit 104 includes a stop of communication of information with the external node by the application communication unit 104 and reduction of frequency of communication or an amount of communication per unit time with the external node by the application communication unit 104.

In the present embodiment, in a case where the real-time communication unit 103 performs communication with the external node, the socket management unit 105 prohibits use of the sockets S other than the socket S2 out of the sockets S1 to Sn. In this way, the socket management unit 105 restricts transmission of information to the external node and reception of information from the external node by the application communication unit 104.

In the present embodiment, the socket management unit 105 restricts both transmission of information to the external node and reception of information from the external node by the application communication unit 104. However, the restriction by the socket management unit 105 is not limited to those as long as the socket management unit 105 restricts at least one of transmission of information to the external node and reception of information from the external node by the real-time communication unit 103. For example, the socket management unit 105 may restrict only transmission of information to the external node by the application communication unit 104. Alternatively, the socket management unit 105 may restrict only reception of information from the external node by the application communication unit 104.

Next, an example of a specific functional configuration of the socket management unit 105 included in the controller 1 according to the present embodiment will be described with reference to FIG. 2.

In the present embodiment, as illustrated in FIG. 2, the socket management unit 105 includes a transmission unit 111, a reception unit 112, a communication restriction unit 113, a communication restriction release unit 114, a communication restriction state management unit 115, and a managed socket registration unit 116.

The managed socket registration unit 116 determines the socket S2 used for real-time communication out of the sockets S1 to Sn on the basis of information transmitted and received to and from the external node by the real-time communication unit 103. The managed socket registration unit 116 then stores the managed socket table indicating the socket number of the specified socket S2 in the socket storage unit 107.

In a case where the communication restriction unit 113 is given by the transmission control unit 102 that the communication with the external node by the application communication unit 104 is to be restricted, the communication restriction unit 113 sets "1" as the transmission restriction state and the reception restriction state stored in the socket storage unit 107.

In a case where the communication restriction release unit 114 is given by the transmission control unit 102 that the restriction on the communication with the external node by the application communication unit 104 is to be released, the communication restriction release unit 114 sets "0" as the transmission restriction state and the reception restriction state stored in the socket storage unit 107.

Accordingly, the transmission restriction state and the reception restriction state each indicate "0" in a case where transmission and reception of information to and from the external node by the application communication unit 104 are not restricted. On the other hand, the transmission restriction state and the reception restriction state each indicate "1" in a case where transmission and reception of information to and from the external node by the application communication unit 104 are restricted.

The communication restriction state management unit 115 reads out the communication restriction states (the transmission restriction state and the reception restriction state) and the managed socket table from the socket storage unit 107, and gives the readout communication restriction states and managed socket table to the transmission unit 111 and the reception unit 112.

The transmission unit 111 controls transmission of information to the external node by the real-time communication unit 103 and the application communication unit 104. Specifically, in a case where transmission of information to the external node is requested by the real-time communication unit 103, the transmission unit 111 transmits the information to the external node by using a socket S (for example, the socket S2) of a socket number indicated by the managed socket table.

Moreover, in a case where transmission of information to the external node is requested by the application communication unit 104, the transmission unit 111 transmits the information to the external node by using a socket S (for example, the socket S1) of a socket number other than the socket number indicated by the managed socket table. However, in a case where the transmission restriction state given by the communication restriction state management unit 115 indicates "1", the transmission unit 111 restricts transmission of information to the external node using a socket S other than the socket S2 indicated by the socket number in the managed socket table given by the communication restriction state management unit 115. That is, the transmission unit 111 restricts transmission of information to the external node by the application communication unit 104.

The reception unit 112 controls reception of information from the external node by the real-time communication unit 103 and the application communication unit 104. Specifically, in a case where reception of information from the external node is requested by the real-time communication unit 103, the reception unit 112 receives information from the external node by using the socket S2 preset in the real-time communication unit 103, and gives the received information to the real-time communication unit 103.

Moreover, in a case where reception of information from the external node is requested by the application communication unit 104, the reception unit 112 receives information from the external node by using the socket S1 preset in the application communication unit 104, and gives the received information to the application communication unit 104. However, in a case where the reception restriction state given by the communication restriction state management unit 115 indicates "1", the reception unit 112 restricts reception of information from the external node using a socket S other than the socket S2 indicated by the socket number indicated by the managed socket table given by the communication restriction state management unit 115. That is, the reception unit 112 restricts reception of information by the application communication unit 104 from the external node.

Figure 3:
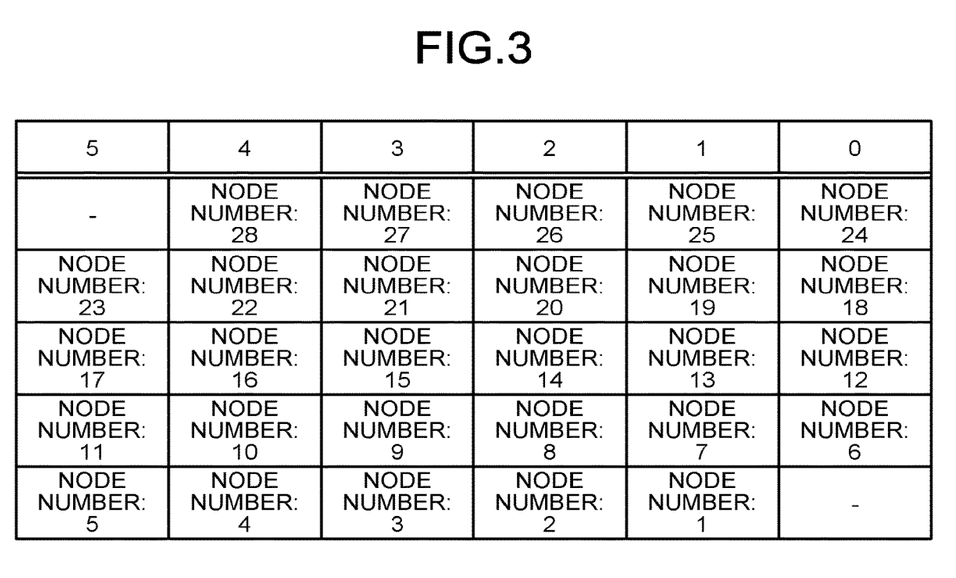
FIG. 3 is a diagram illustrating an example of an Inring map stored in the controller according to the first embodiment.

FIG. 3 is a diagram illustrating an example of the Inring map stored in the controller according to the first embodiment. Next, an example of the Inring map stored in the node storage unit 106 of the controller 1 according to the present embodiment will be described with reference to FIG. 3.

Each node connected to the LAN is assigned a number (hereinafter referred to as a node number) for identifying the corresponding node. As illustrated in FIG. 3, the Inring map includes a position (hereinafter referred to as a bit position) corresponding to the node number of each node, and a participation state is written onto the bit position corresponding to the node number of each node. The participation state is 1-bit information indicating whether or not the node performs real-time communication. In the present embodiment, the participation state indicates "1" in a case where the node performs real-time communication, and indicates "0" in a case where the node does not perform real-time communication.

For example, in a case where a node with a node number "25" performs real-time communication, the participation state at the bit position corresponding to the node number "25" in the Inring map indicates "1". In a case where a node with a node number "15" does not perform real-time communication, the participation state at the bit position corresponding to the node number "15" in the Inring map indicates "0".

The LAN management unit 101 determines, as described above, a node that performs real-time communication among the nodes connected to the LAN on the basis of a result of communication with the external node by the real-time communication unit 103. The LAN management unit 101 generates an Inring map in which the participation state of a node specified as a node performing real-time communication indicates "1", and writes the generated Inring map onto the node storage unit 106.

Figure 4:
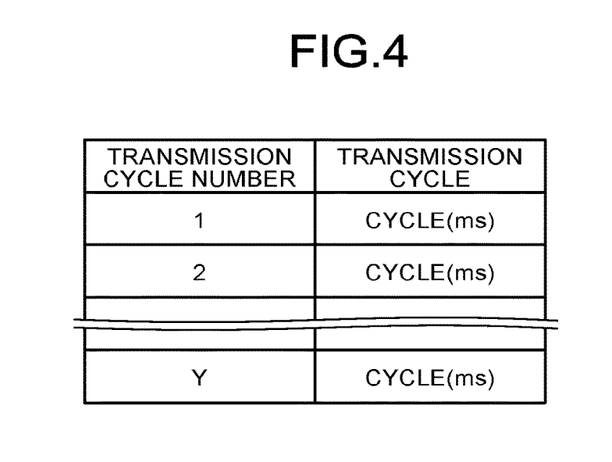
FIG. 4 is a diagram for explaining an example of processing for determining a node that has obtained a transmission right by the controller according to the first embodiment.

FIG. 4 is a diagram for explaining an example of processing for determining a node that has obtained a transmission right by the controller according to the first embodiment. Next, an example of processing for determining a node that has obtained a transmission right by the transmission control unit 102 of the controller 1 according to the present embodiment will be described with reference to FIG. 4.

In the present embodiment, as illustrated in FIG. 4, a transmission period is preset in association with a transmission period number indicating a priority preset for each node. In the present embodiment, it is assumed that the LAN management unit 101 causes the transmission right to go around (circulate) in ascending order of the node numbers among the nodes with node numbers whose participation state indicates "1" in the Inring map illustrated in FIG. 3.

In this case, the LAN management unit 101 transfers the transmission right to a next node when a transmission period corresponding to a transmission period number indicating a priority of a node to which the transmission right has been transferred elapses or when transmission of information to the external node by the real-time communication unit 103 of each node is completed. In this way, the LAN management unit 101 controls transmission of information to the external node by the real-time communication unit 103 of each node such that the transmission of the information to the external node by the real-time communication unit 103 of each node is completed within a transmission period.

Figure 5:
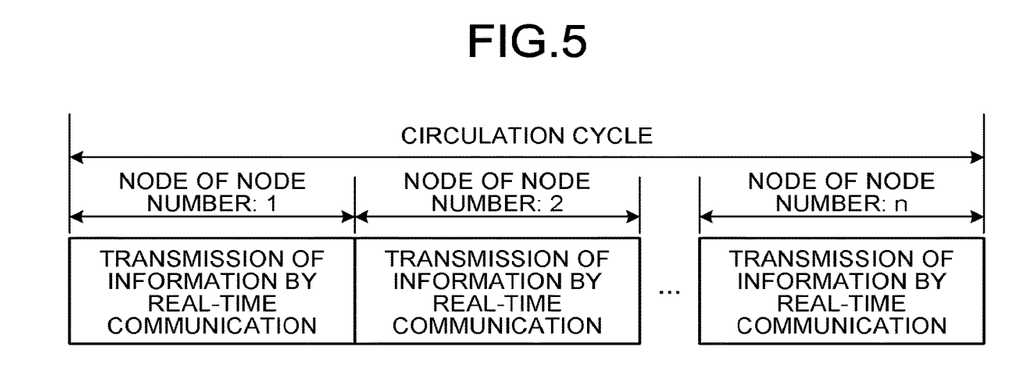
FIG. 5 is a diagram for explaining an example of processing for transmitting information to the external node by a real-time communication unit of the controller according to the first embodiment.

FIG. 5 is a diagram for explaining an example of processing for transmitting information to the external node by the real-time communication unit of the controller according to the first embodiment. Next, an example of processing for transmitting information to the external node by the real-time communication unit 103 of the controller 1 according to the present embodiment will be described with reference to FIG. 5.

In the present embodiment, the LAN management unit 101 causes the transmission right to go around in ascending order from the node with the node number "1" in synchronization with the LAN management units 101 of external nodes as illustrated in FIG. 5. Then, as illustrated in FIG. 5, the real-time communication unit 103 of the node that has obtained the transmission right transmits information to the external node within a transmission period corresponding to a transmission period number of the node.

In this way, as illustrated in FIG. 5, the LAN management unit 101 completes transmission of information by all the nodes performing real-time communication within a preset circulation period. The circulation period is a period of time permitted for one round through all the nodes connected to the LAN and performing real-time communication.

By the way, each node performing real-time communication may include, as in the controller 1, an application communication unit 104 that communicates with the external node in a communication procedure differing from that of the real-time communication unit 103.

In this case, there is a possibility that real-time communication by the real-time communication unit 103 fails due to communication with the external node by the application communication unit 104 and thereby an influence such as a delay occurs in the real-time communication.

Moreover, it is sometimes impossible to complete transmission of information by all the nodes that perform real-time communication within the circulation period in a case where the real-time communication units 103 of all the nodes that perform real-time communication transmit information to the external node by using transmission periods of the nodes to the maximum.

Considering the above, in the present embodiment, in a case where the transmission restriction state given by the communication restriction state management unit 115 is "0", the transmission unit 111 transmits information to the external node in response to a request for transmission of information to the external node from the application communication unit 104. In a case where the reception restriction state given by the communication restriction state management unit 115 indicates "0", the reception unit 112 receives information from the external node in response to a request by the application communication unit 104 for reception of information from the external node, and gives the received information to the application communication unit 104.

On the other hand, in a case where the transmission restriction state given by the communication restriction state management unit 115 indicates "1", the transmission unit 111 determines whether or not a socket number of a socket S used for transmitting information to the external node matches a socket number indicated by the managed socket table.

In response to determining that the socket number of the socket S used to transmit the information to the external node matches the socket number indicated by the managed socket table, the transmission unit 111 judges that the socket S used to transmit the information to the external node is the socket S used by the real-time communication unit 103, and then continues to transmit the information to the external node.

On the other hand, in response to determining that the socket number of the socket S used to transmit the information to the external node does not match the socket number indicated by the managed socket table, the transmission unit 111 judges that the socket S used to transmit the information to the external node is a socket S used by the application communication unit 104, and then does not continue but stops the transmission of the information to the external node using the socket S.

At this time, the transmission unit 111 gives, to the application communication unit 104, an error number of transmission of information to the external node. The error number to be given is a number indicating that, because information cannot be temporarily transmitted to the external node, transmission of information to the external node is requested again after a preset time elapses.

In a case where the reception restriction state given by the communication restriction state management unit 115 indicate "1", the reception unit 112 determines whether or not a socket number of a socket S used to receive information from the external node matches the socket number indicated by the managed socket table.

In response to determining that the socket number of the socket S used to receive the information from the external node matches the socket number indicated by the managed socket table, the reception unit 112 judges that the socket S used to receive the information from the external node is a socket S used by the real-time communication unit 103, and then continues to receive the information from the external node.

On the other hand, in response to determining that the socket number of the socket S used to receive the information from the external node does not match the socket number indicated by the managed socket table, the reception unit 112 judges that the socket S used to receive the information from the external node is a socket S used by the application communication unit 104, and then does not continue but stops the reception of the information from the external node using the socket S.

At this time, the reception unit 112 gives, to the application communication unit 104, an error number of reception of information from the external node. The error number to be given is a number indicating that, because information cannot be temporarily received from the external node, reception of information from the external node is requested again after a preset time elapses.

As described above, according to the controller 1 of the first embodiment, in a case where an application that performs communication between nodes in accordance with a communication procedure differing from real-time communication is included, it is possible to prevent communication (real-time communication) with the external node by the real-time communication unit 103 from failing. As a result, a delay of real-time communication by the real-time communication unit 103 can be suppressed.

Second Embodiment

The present embodiment is an example that reception of information by an application communication unit from the external node is restricted after a time when an external node having a preceding order of transmission obtains a transmission right and for a time during which the controller itself possesses the transmission right. In the following description, description of configurations similar to those of the first embodiment is omitted.

Figure 6:
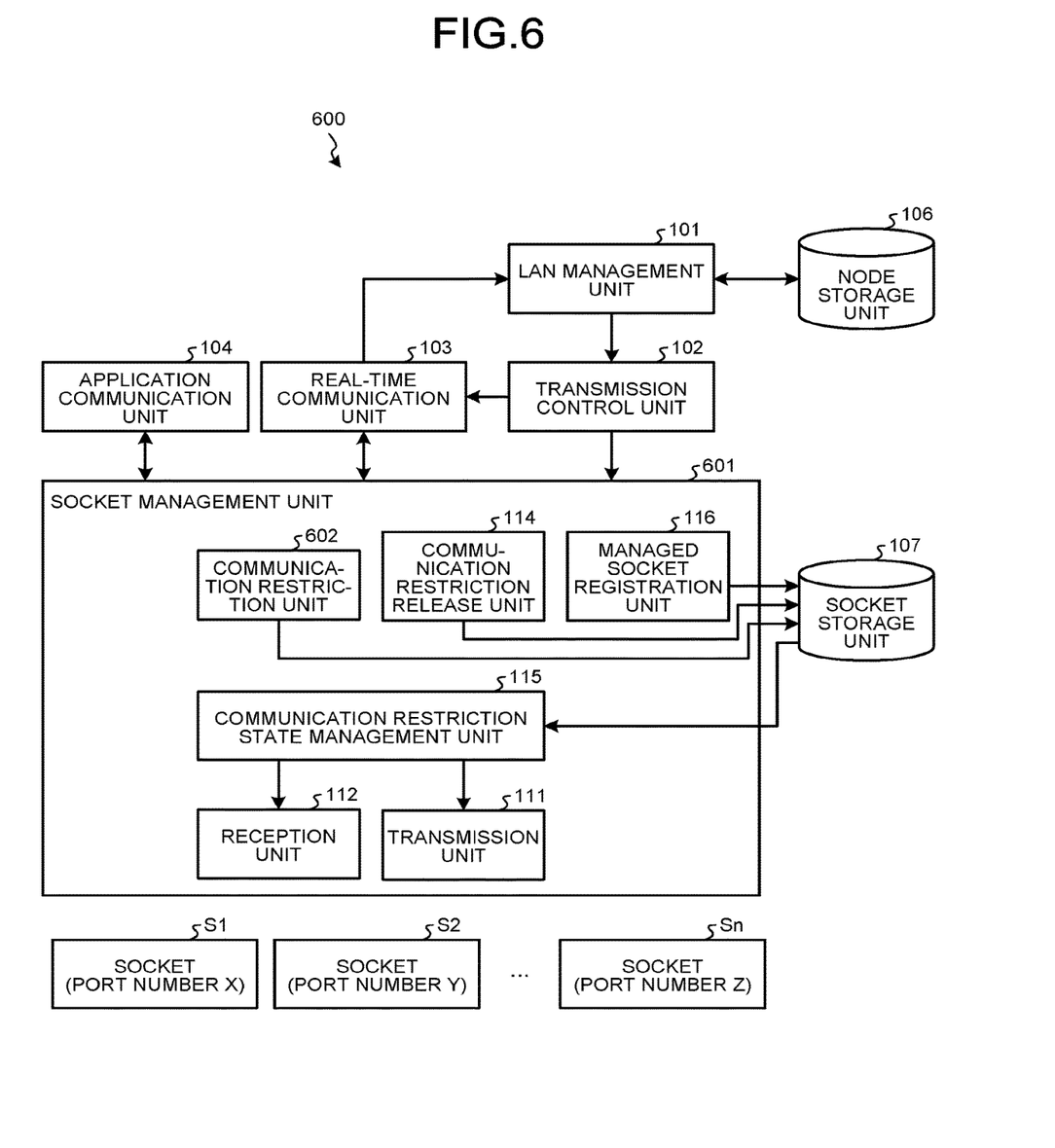
FIG. 6 is a block diagram illustrating an example of a functional configuration of a controller according to a second embodiment.

FIG. 6 is a block diagram illustrating an example of a functional configuration of a controller according to a second embodiment. As illustrated in FIG. 6, a controller 600 according to the present embodiment includes a LAN management unit 101, a transmission control unit 102, a real-time communication unit 103, an application communication unit 104, a socket management unit 601, a node storage unit 106, and a socket storage unit 107. As illustrated in FIG. 6, the socket management unit 601 includes a transmission unit 111, a reception unit 112, a communication restriction unit 602, a communication restriction release unit 114, a communication restriction state management unit 115, and a managed socket registration unit 116.

The LAN management unit 101 detects whether or not transmission of information by a node possessing a transmission right has been completed within a preset period, on the basis of a result of communication with the external node by the real-time communication unit 103. In a case where the transmission of the information by the node possessing the transmission right has not been completed within the preset period, the LAN management unit 101 transfers the transmission right to a node of the next order of transmission without waiting for completion of the transmission of the information by the node.

By the way, timing of transferring the transmission right to a next node in transmission order is delayed in a case that communication with the external node by the real-time communication unit 103 is delayed due to communication by the application communication unit 104 and detection as to whether or not transmission of information by a node possessing the transmission right has been completed within the preset period is delayed.

Considering the above, in the present embodiment, the socket management unit 601 restricts reception of information by the application communication unit 104 from the external node after a time when an external node having a preceding order of transmission with respect to the controller 600 is judged to obtain a transmission right and for a time during which the controller 600 itself possesses the transmission right.

This makes it possible to suppress a delay in reception of information by the real-time communication unit 103 from the node of the preceding transmission order, thereby preventing, from being delayed, detection of whether or not transmission of information by the preceding node has been completed within the preset period. As a result, a timing at which the transmission right is transferred to the controller 600 itself can be prevented from being delayed, and a delay of real-time communication can be reduced.

More specifically, when the transmission control unit 102 determines that the preceding node has obtained the transmission right, the communication restriction unit 602 sets "1" as the reception restriction state stored in the socket storage unit 107.

When the reception restriction state becomes "1", the reception unit 112 restricts reception of information using a socket S other than a socket S2 indicated by a socket number included in the managed socket table. That is, the reception unit 112 restricts reception of information by the application communication unit 104 from the external node when the preceding node obtains the transmission right.

Thereafter, in response to determining by the transmission control unit 102 that the transmission right has been transferred to a node of a next order of transmission with respect to the controller 1, the communication restriction release unit 114 sets "0" as the reception restriction state stored in the socket storage unit 107.

When the reception restriction state becomes "0", the reception unit 112 resumes the reception of information using the socket S other than the socket S2 indicated by the socket number indicated by the managed socket table.

Figure 7:
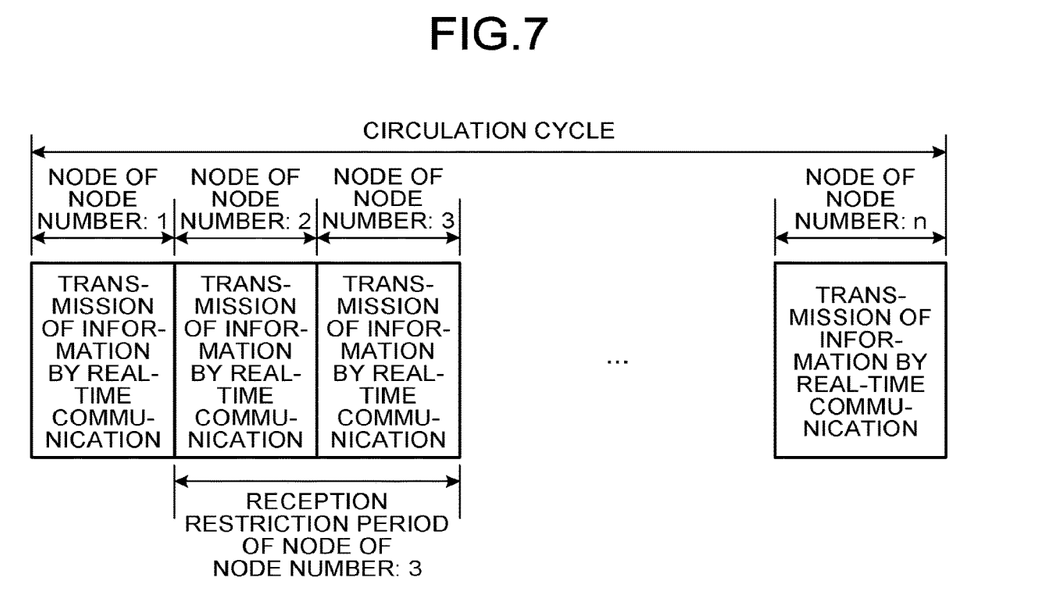
FIG. 7 is a diagram for explaining an example of processing for restricting communication of an application communication unit of the controller according to the second embodiment.

FIG. 7 is a diagram for explaining an example of processing for restricting communication of the application communication unit of the controller according to the second embodiment. Next, an example of processing for restricting communication of the application communication unit 104 in the controller 600 according to the present embodiment will be described with reference to FIG. 7.

In a case where the controller 600 is, for example, a node with a node number "3", the communication restriction unit 602 sets "1" as the reception restriction state stored in the socket storage unit 107 when the transmission control unit 102 determines that a node with a node number "2", which has a preceding order of transmission, has obtained the transmission right.

With the above processing, the reception unit 112 restricts reception of information by the application communication unit 104 from the external node after a time when the node with the node number "2" having a preceding order of transmission obtains a transmission right and for a time during which the controller 600 itself possesses the transmission right. In other words, as illustrated in FIG. 7, a reception operation by the application communication unit 104 is restricted from a beginning of a time period during which the node with the node number "2" possesses the transmission right until an end of a time period during which the controller 600 (with the node number "3") possesses the transmission right.

In this way, according to the controller 600 of the second embodiment, it is possible to suppress a delay in reception of information by the real-time communication unit 103 from a node having a preceding order of transmission, and possible to prevent a delay in detection as to whether or not transmission of information by the preceding node has been completed within the preset period. As a result, a timing at which the transmission right is transferred to the controller 600 itself can be prevented from being delayed, and a delay of real-time communication can be reduced.

Third Embodiment

The present embodiment is an example that transmission of information by an application communication unit to the external node is restricted while a controller itself possesses a transmission right. In the following description, description of configurations similar to those of the second embodiment is omitted.

Figure 8:
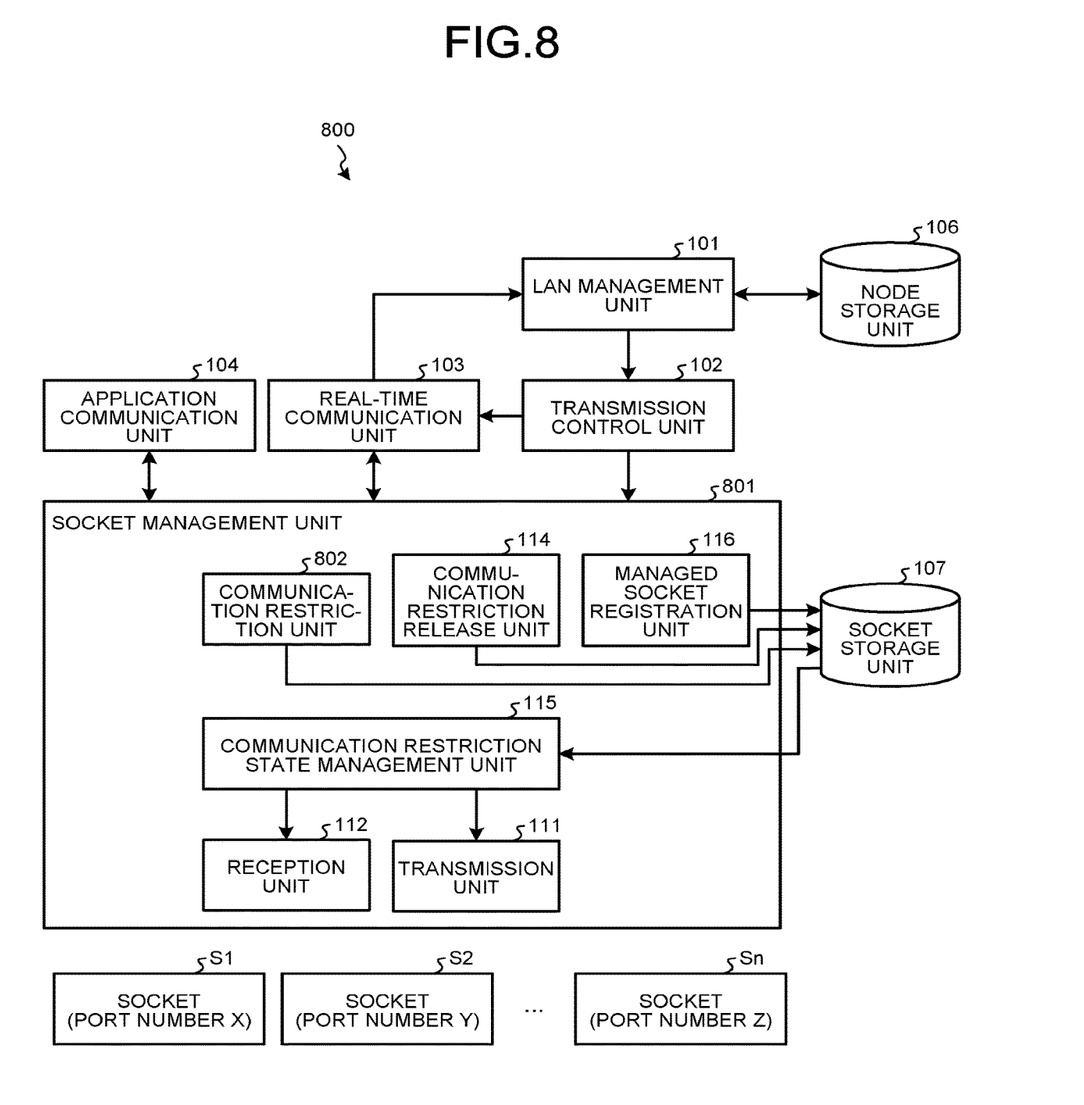
FIG. 8 is a block diagram illustrating an example of a functional configuration of a controller according to a third embodiment.

FIG. 8 is a block diagram illustrating an example of a functional configuration of a controller according to a third embodiment. As illustrated in FIG. 8, a controller 800 according to the present embodiment includes a LAN management unit 101, a transmission control unit 102, a real-time communication unit 103, an application communication unit 104, a socket management unit 801, a node storage unit 106, and a socket storage unit 107. As illustrated in FIG. 8, the socket management unit 601 includes a transmission unit 111, a reception unit 112, a communication restriction unit 802, a communication restriction release unit 114, a communication restriction state management unit 115, and a managed socket registration unit 116.

In the present embodiment, the socket management unit 801 restricts transmission of information by the application communication unit 104 to the external node while the controller 800 itself is judged by the transmission control unit 102 to possess a transmission right. With this processing, not only reception of information by the application communication unit 104 from the external node, but also transmission of information by the application communication unit 104 to the external node can be restricted. As a result, a delay in transmission of information to the external node by the real-time communication unit 103 can be further reduced.

More specifically, in response to determining by the transmission control unit 102 that the controller 800 itself has obtained the transmission right, the communication restriction unit 602 sets "1" as the transmission restriction state stored in the socket storage unit 107.

When the transmission restriction state becomes "1", the transmission unit 111 restricts transmission of information using a socket S other than a socket S2 indicated by a socket number included in a managed socket table. That is, the transmission unit 111 restricts transmission of information by the application communication unit 104 to the external node when the controller 800 itself obtains the transmission right.

Thereafter, when the transmission control unit 102 determines that the transmission right has been transferred to a node having a next order of transmission with respect to the controller 800 itself, the communication restriction release unit 114 sets "0" as the transmission restriction state stored in the socket storage unit 107.

Figure 9:
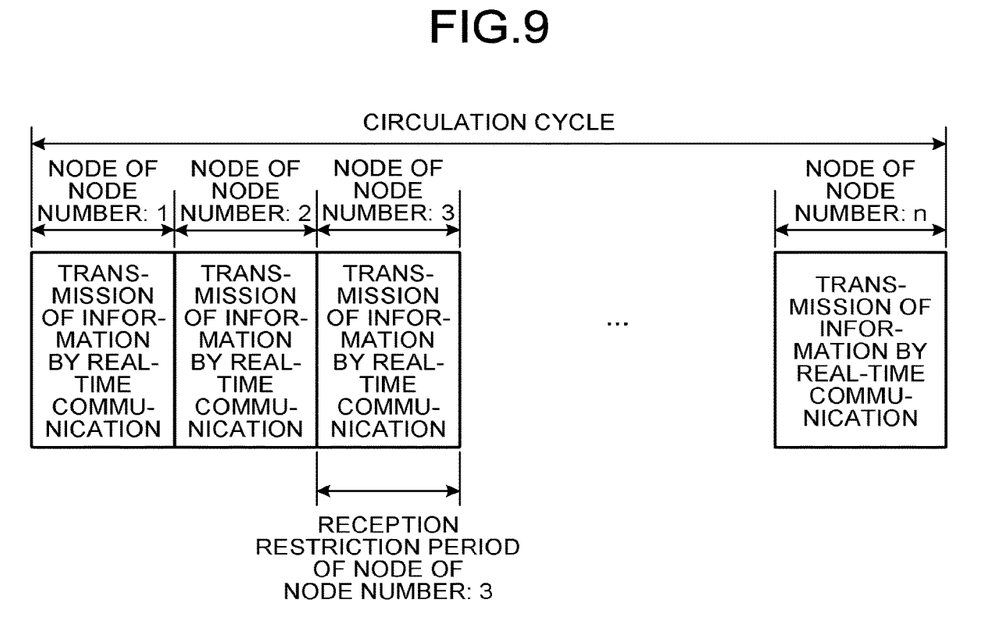
FIG. 9 is a diagram for explaining an example of processing for restricting communication of an application communication unit of the controller according to the third embodiment.

FIG. 9 is a diagram for explaining an example of processing for restricting communication of the application communication unit of the controller according to the third embodiment. Next, an example of processing for restricting communication by the application communication unit 104 in the controller 800 according to the present embodiment will be described with reference to FIG. 9.

For example, in a case where the controller 800 is a node with a node number "3", the communication restriction unit 802 sets "1" as the transmission restriction state stored in the socket storage unit 107 when the transmission control unit 102 determines that the node with the node number "3" has obtained the transmission right. In this way, the transmission unit 111 restricts transmission of information by the application communication unit 104 to the external node during a period where the controller 800 itself possesses the transmission right.

As described above, according to the controller 800 of the third embodiment, not only reception of information by the application communication unit 104 from the external node, but also transmission of information by the application communication unit 104 to the external node can be restricted. As a result, a delay in transmission of information by the real-time communication unit 103 to the external node can be further reduced.

As described above, according to the first to third embodiments, it is possible to suppress a delay of real-time communication by the real-time communication unit 103.

Although some embodiments of the present invention have been described, these embodiments have been presented as examples, and are not intended to limit the scope of the invention. These novel embodiments can be implemented in various other forms, and various omissions, substitutions, and changes can be made without departing from the gist of the invention. These embodiments and modifications thereof are encompassed within the scope and gist of the invention, and are encompassed within the invention described in the claims and equivalents thereof.

The invention claimed is:

1. A controller comprising:
a hardware processor configured to function as:
a real-time communication unit to perform real-time communication with an external node by using a first socket on a basis of a transmission right map indicating a node possessing a transmission right out of multiple nodes, the multiple nodes including a node as the controller and an external node being a node other than the node as the controller;
an application communication unit to perform; not on a basis of the transmission right map, non-real-time communication with the external node by using a second socket differing from the first socket; and
a socket management unit to restrict at least one of transmission and reception of information by the application communication unit to and from the external node while real-time communication is performed by real-time communication unit, wherein
the transmission right circulates through the multiple nodes in a preset order, and
the socket management unit restricts the reception of information by the application communication unit from the external node after a time when an order of obtaining the transmission right based on the transmission right map is judged to reach a preceding order with respect to the controller and for a time during which the controller possesses the transmission right.

2. The controller according to claim 1, wherein the socket management unit restricts transmission of information by the application communication unit to the external node while the controller itself possesses the transmission right.

3. The controller according to claim 1, wherein the restriction on the at least one of transmission and reception of information by the application communication unit through non-real-time communication is a stop of the non-real-time communication.

4. The controller according to claim 1, wherein the restriction on the at least one of transmission and reception of information by the application communication unit through non-real-time communication is reduction of frequency of the non-real-time communication or reduction of an amount of the non-real-time communication per unit time.

* * * * *